(12) United States Patent
Komatsu et al.

(10) Patent No.: US 7,405,587 B2
(45) Date of Patent: Jul. 29, 2008

(54) INTERFACE CIRCUIT WITH A TERMINATOR AND AN INTEGRATED CIRCUIT AND AN ELECTRONIC EQUIPMENT HAVING THE SAME

(75) Inventors: Fumikazu Komatsu, Okaya (JP); Yasunari Furuya, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 11/428,507

(22) Filed: Jul. 3, 2006

(65) Prior Publication Data

US 2007/0007994 A1   Jan. 11, 2007

(30) Foreign Application Priority Data

Jul. 6, 2005    (JP) .............................. 2005-197931

(51) Int. Cl.
*H03K 17/16*   (2006.01)
*H03K 19/003*   (2006.01)
(52) U.S. Cl. .............................. 326/30; 326/86; 326/37
(58) Field of Classification Search .................. 326/30, 326/38, 36
See application file for complete search history.

(56) References Cited

U.S. PATENT DOCUMENTS 5,151,611 A * 9/1992 Rippey ...................... 327/525
5,510,727 A * 4/1996 Culmer et al. ................ 326/30
6,147,520 A * 11/2000 Kothandaraman et al. ..... 327/77

FOREIGN PATENT DOCUMENTS

JP    A-2003-270299    9/2003

* cited by examiner

*Primary Examiner*—Anh Q Tran
(74) *Attorney, Agent, or Firm*—Oliff & Berridge, PLC

(57) ABSTRACT

Provided is an interface circuit having a terminator, in which the terminator includes parallel-connected first to an $N^{th}$ resistance elements, where N is an integral number equal to or more than 2, and a first to an $n^{th}$ cut-off elements connected in serial with each of the corresponding $n(1 \leq n < N)$ first to the $N^{th}$ resistance elements of the first to the $N^{th}$ resistance elements.

17 Claims, 10 Drawing Sheets

INTERFACE CIRCUIT WITH A TERMINATOR AND AN INTEGRATED CIRCUIT AND AN ELECTRONIC EQUIPMENT HAVING THE SAME

BACKGROUND

1. Technical Field

The present invention relates to an interface circuit with a terminator and an integrated circuit device and an electronic equipment having the same.

2. Related Art

The interface circuit with the terminator, for example, a driver IC with a high speed serial interface circuit never exists. Some of ICs have external terminators. However, if the high speed serial interface circuit is installed in the driver IC, the external terminator can hardly be installed. As for the high speed serial interface circuit, USB or Universal Serial Bus, IEEE1394 or the like has been known. Some of them have terminators; however, they have not been designed considering adverse effects due to a wiring resistance, a parasitic resistance or the like. See JP-A-2003-270299.

SUMMARY

An advantage of some aspects of the invention is to provide the interface circuit capable of precisely adjusting the terminator for which an absolute accuracy is required, and the integrated circuit device and the electronic equipment having such interface circuit.

Another advantage of some aspects of the invention is to provide the interface circuit capable of precisely adjusting the terminator substantially ignoring the parasitic resistance or the wiring resistance, even if those exist, and the integrated circuit device and the electronic equipment having such interface circuit.

The invention is directed to the interface circuit having the terminator featured in having parallel-connected first to $N^{th}$ resistance elements, where N is an integral number equal to or more than 2, and a first to $n^{th}$ cut-off elements connected in serial with each of the corresponding $n(1 \leq n < N)$ resistance elements among the first to the $N^{th}$ resistance elements.

According to an aspect of the invention, the number of the parallel-connected resistance elements can be changed depending on whether or not each of the n cut-off elements are cut, thereby achieving precise adjustment of a resistance value of the terminator.

According to another aspect of the invention, resistance characteristic of the terminator can be assured by adjusting differentials in temperature or processes while manufacturing the integrated circuit device to which the interface circuit is to be installed, since the terminator is provided integral with the interface circuit.

According to a further aspect of the invention, an inequity of $L/N < M < L/(N-n)$ can be established, where a designed value of the terminator is $M\Omega$ and a designed value of each resistance value of each of the first to $N^{th}$ resistance elements is $L\Omega$.

Provided that the resistance values L/N on design according to the parallel-connected N resistance elements are smaller than the designed value M when all the cut-off elements are not cut, and further provided that the resistance values L/(N−n) on design according to the parallel-connected (N−n) resistance elements are larger than the designed value M when all the cut-off elements are cut, the resistance values can accurately be approximate to the designed value M of the terminator by cutting the cut-off elements, even if an actual resistance value of each of the parallel lines, including wiring resistance and parasitic resistance, varies.

According to a still further aspect of the invention, each of the first to $n^{th}$ cut-off elements is formed on the uppermost metal layer and a ring shaped wiring can be provided in such a manner enclosing the first to the $n^{th}$ cut-off elements in a plane view and simultaneously superimposing layers one another from the lowermost metal layer to the uppermost metal layer. In this case, both ends of each of the first to the $n^{th}$ cut-off elements are connected, respectively, to the first and the second nonmetal resistance elements formed on a nonmetal wiring layer positioned under the lowermost metal layer.

As stated above, the resistance value of each of the N parallel lines becomes the resistance value of each of the first to the $N^{th}$ resistance elements, and also both ends of the first to the nth cut-off elements have the first and the second nonmetal resistance elements, respectively. Even in such a case, the resistance value can be accurately approximate to the designed value M of the terminator by cutting off the cut-off elements.

According to a still further aspect of the invention, the resistance value of each of the first to the $N^{th}$ resistance elements can be made to the resistance value larger by two digits than the digit number of the resistance value of the first nonmetal resistance element connected to one end of each of the first to the $n^{th}$ cut-off elements.

When this is done, the value of the first nonmetal resistance element connected to one end of each of the first to the $n^{th}$ cut-off elements becomes satisfactory small with respect to the value of each of the first to the $N^{th}$ resistance elements, such that an adverse effect of the resistance value of the resistor connected to one end of each of the first to the $n^{th}$ cut-off elements can be satisfactory minimized. Further, a length L and a width W of each of the first to the $N^{th}$ resistance elements can be made larger, such that an absolute characteristic of the elements will accord to an theoretical value with ease, thereby being obtainable of the accurate resistance value of the terminator.

According to a still further aspect of the invention, k spare lines, where k is a natural number, are arranged in parallel with N parallel lines having the corresponding one of the first to the $N^{th}$ resistance elements, one end of each of the k spare lines has a free end, and each of k spare lines is provided with a spare resistance element having the same resistance value on design as one of the first to the $N^{th}$ resistance element.

According to a still further aspect of the invention, whether or not the k spare lines are connected to a DP wiring is selectable upon manufacturing the same, thereby being capable of changing the number of the parallel lines, which can contribute to an adjustment of the resist value of the terminator.

According to a still further aspect of the invention, the second nonmetal resistance element can be formed on the nonmetal wiring layer to which the other end of each of the first to the $n^{th}$ cut-off elements is commonly connected.

When this is done, an area of the second nonmetal resistance element can be made sufficiently larger than an area of each of the N first nonmetal resistance elements, such that the resistance value of the second nonmetal resistance element can be made sufficiently smaller than the resistance value of each of the first to the $N^{th}$ resistance elements. As such, upon the adjustment of the terminator, a presence of the second nonmetal resistant layer can be substantially ignored.

According to a still further aspect of the invention, a third nonmetal resistance element having the same resistance value on design as that of the first nonmetal resistance element can be connected, respectively, to each of (N−n) parallel lines to which the first to the $n^{th}$ cut-off elements are not connected and each of the k spare lines.

If an adverse effect caused by the first nonmetal resistance element can not be ignored, the third nonmetal resistance element is provided on each of the parallel lines to which fuse elements are not connected and the spare lines, respectively, in order to minimize a differential of the resistance value between lines.

The invention may have n parallel lines each having corresponding one of the first to the $n^{th}$ cut-off elements and remaining (N−n) parallel lines, in which an arrangement pitch of the N parallel lines is larger than that of the (N−n) parallel lines, and in which a dummy resistance element which is not connected to any of the first to the $n^{th}$ cut-off elements may be provided between n resistance elements directly connected to the corresponding one of the first to the $n^{th}$ cut-off elements among the first to the $N^{th}$ resistance elements.

When this is done, the arrangement pitches of the first to the $N^{th}$ resistance elements, the spare resistance elements and the dummy resistance elements are made to be constant, thereby being obtainable of an accurate patterning of each of the resistance elements and a reduction of the differential between the resistance values.

The integrated circuit device according to the invention is featured in having the above described interface circuit, a first signal terminal for receiving a pair of differential signals, a second signal terminal for receiving the other one of the pair of differential signals, a first signal line connected to the first signal terminal and a second signal line connected to the second signal terminal, in which the terminator is provided between the first signal line and the second signal line.

The terminator having the above described structure is applicable to be provided between a pair of differential signal lines composed of the first and the second signal lines connected to the first and the second signal terminals in the integrated circuit device, respectively.

According to an aspect of the integrated circuit device according to the invention, the first signal terminal has two first pads having a mutual conduction and receiving contacts from two probes, and the second signal terminal has two pads having a mutual conduction and receiving contacts from two probes.

When this is done, the terminator can be measured with a high accuracy by means of the four-terminal method by using two first pads and two second pads for the sake of two current supply terminals and two voltage measurement terminals.

According to another aspect of the integrated circuit device of the invention, the first to the $N^{th}$ resistance elements can be arranged in a first direction in which two first pads and two second pads are arranged along. Since the first to the $N^{th}$ resistance elements can be arranged in a direction parallel with the arrangement direction of four pads, a longitudinal area secured for the four pads can be utilized effectively.

According to a still further aspect of the integrated circuit device of the invention, a length of an area where the first to the $N^{th}$ resistance elements are arranged in the first direction can be made shorter than that of an area where the two first pads and the two second pads are arranged in the first direction. With such a construction, it is not necessary to secure an extra area for the sake of the first to the $N^{th}$ resistance elements.

An electronic equipment according to the invention includes the above stated integrated circuit device.

DESCRIPTION OF EXEMPLARY EMBODIMENTS

An embodiment of the invention will be described with reference to the accompanying drawings. The embodiment as described hereinafter will not inadequately limit the scope of the invention as defined in the scope of the claims attached hereto. It should be appreciated that not all the elements as described hereinafter are essential to the invention. In the following, like numbers represent like elements.

1. Display Driver

Figure 1A:
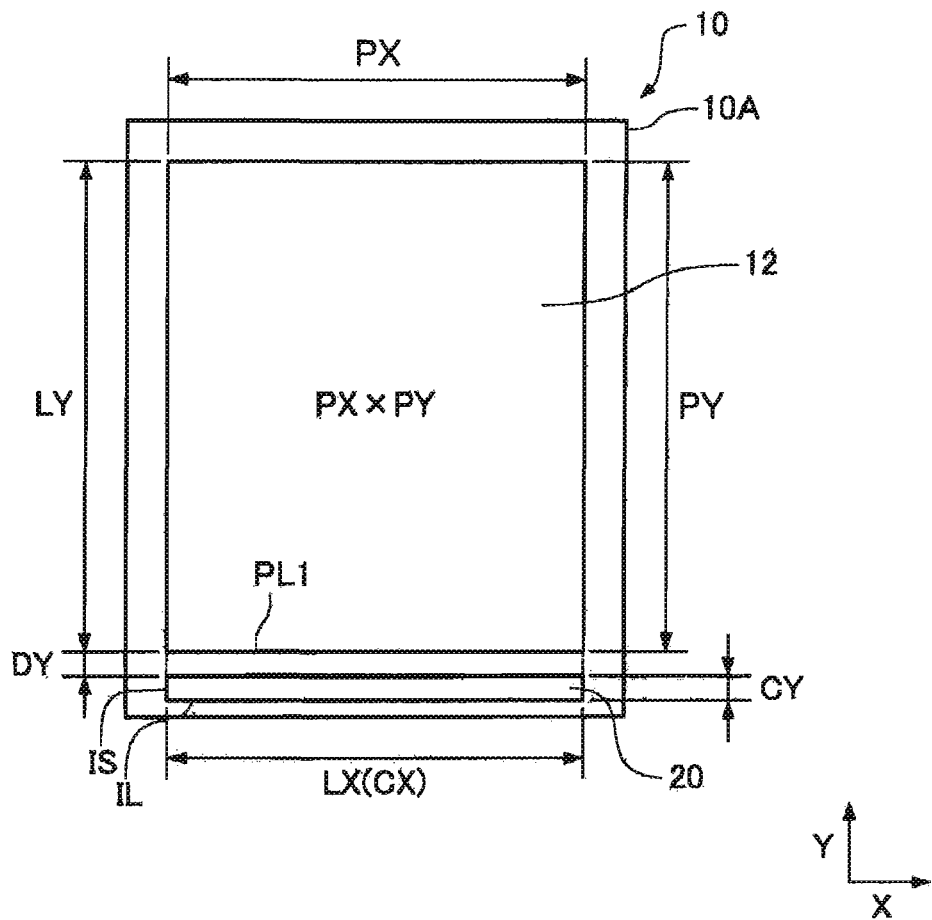
FIGS. 1A and 1B illustrates an integrated circuit device according to an embodiment of the invention.

FIG. 1A shows a display panel 10 having a display driver 20 or an integrated circuit device in broad meaning. In the embodiment, the display driver 20 or the display panel 10 with the display driver 20 can be installed in a compact electronic equipment which is not shown in FIG. 1. The compact electronic equipment exemplifies a cellular phone, a PDA, a digital music player with the display panel or the like. The display panel 10 is formed, for example, with a plurality of display pixels on a glass substrate 10A. In accordance with the display pixels, a plurality of data lines which are not shown but extending in a Y direction and a plurality of scanning lines which are also not shown but extending in an X direction run on the display panel 10. The display pixels formed on the display panel 10 according to the embodiment are, not limited to, liquid crystal elements, but light emitting elements such as electro-luminescence elements may also be employed. Further, the display pixels may be either type such as an active type with a transistor or the like or a passive type without the transistor or the like. For example, if the active type display pixels are applied to a display area 12, either one of the an amorphous TFT or a low temperature polysilicon TFT may be employed for the crystal liquid pixels.

The display driver 20 is dimensioned to have a length CX in the X direction and a length CY in the Y direction. A longer side IL of the display driver 20 having the length CX is in parallel with one side PL1 of the display area 12 at a side of the display driver 20. In other words, the display driver 20 is mounted on the display panel 10 in such a manner that the longer side IL becomes in parallel with the one side PL1 of the display area 12.

Figure 1B:
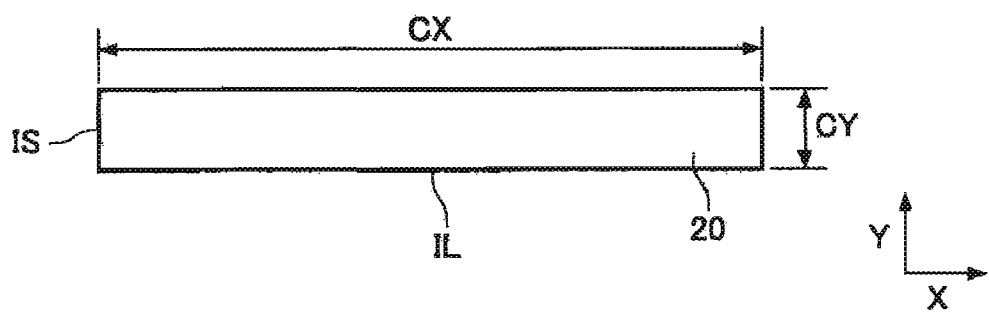

FIG. 1B shows a size of the display driver 20. A shorter side IS of the display driver 20 having the length CY and a longer side IL of the display driver 20 have a relationship, for example, of a range between 1:9 and 1:11, namely, the shorter side IS is remarkably shorter than the longer side IL. With such a thin longitudinal shape, a chip size of the display driver 20 in the Y direction can be minimized to the limit thereof.

In FIG. 1A, the length LX of the display area 12 in the X direction is equal to the length CX of the display driver 20 in the X direction. It is preferable, but not limited to FIG. 1A, that the length LX and the length CX have the same length. The reason thereof is shown in FIG. 2A.

Figure 2A:
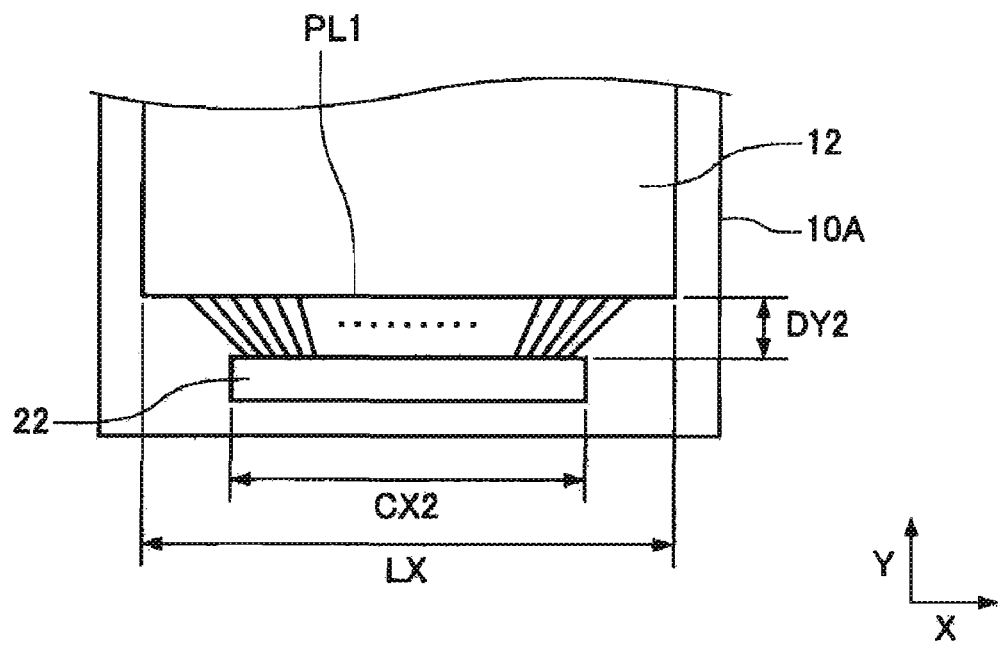
FIG. 2A illustrates a portion of a comparing example according to the embodiment of the invention.

In FIG. 2A, the display driver 22 is configured to have a length CX2 in the X direction. The length CX2 is shorter than the length LX of the one side PL1 of the display area 12, such that a plurality of wires for connecting the display driver 22 with the display area 12 cannot be arranged in parallel with the Y direction. Therefore, a distance DY2 between the display area 12 and the display driver 22 has to be rather long. In such a structure, a glass substrate 10A of the display panel 10 has to be unnecessarily large, resulting in hindering a cost reduction. Further, in a case where the display panel 10 is mounted on the more compact electronic equipment, an area other than the display area 12 becomes large, resulting in hindering a down sizing of the electronic equipment.

Figure 2B:
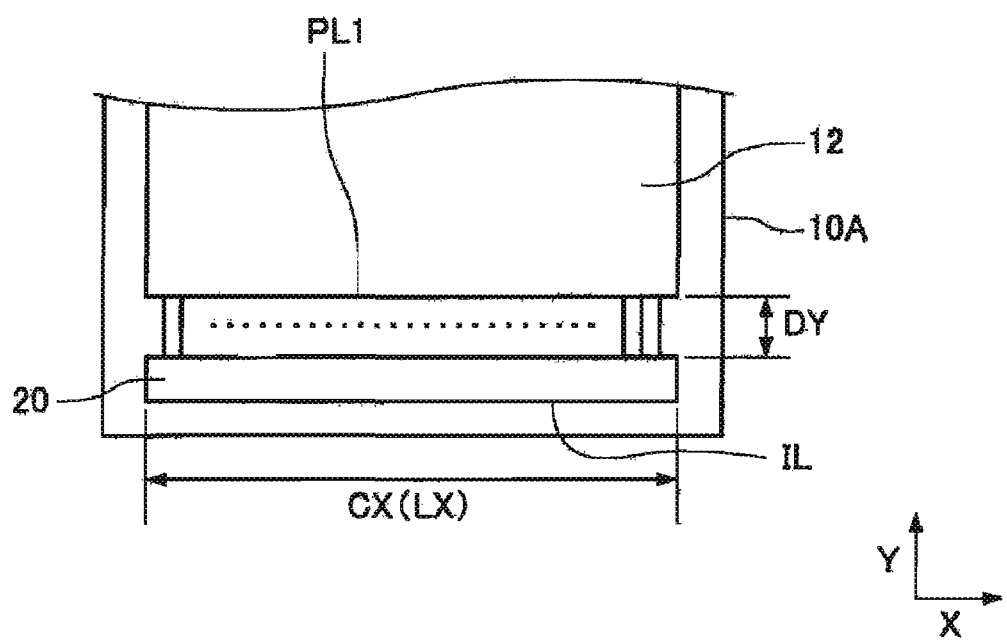
FIG. 2B illustrates a portion of the integrated circuit device according to the embodiment of the invention.

On the other hand, the display driver 20 according to the embodiment as shown in FIG. 2B is configured in such a manner that the length CX of the longer side IL is the same length as the length LX of the one side PL1 of the display area 12, such that the plurality of wires between the display driver 20 and the display area 12 can be arranged in parallel with the Y direction. Therefore, a distance DY between the display driver 20 and the display area 12 can be shorter than the length DY2 as illustrated in FIG. 2A. Further, since a length IS of the display driver 20 in the Y direction is short, the glass substrate 10A of the display panel 10 in the Y direction becomes smaller, resulting in contributing to the downsizing of the electronic equipment.

In the embodiment, the length CX of the longer side IL of the display driver 20, not limited to, but is the same length as the length LX of the one side PL1 of the display area 12. Like advantageous result will be produced in such a case, for example, where the longer side IL of the display driver 20 is longer than the length LX of the one side PL1 of the display area 12.

Figure 3:
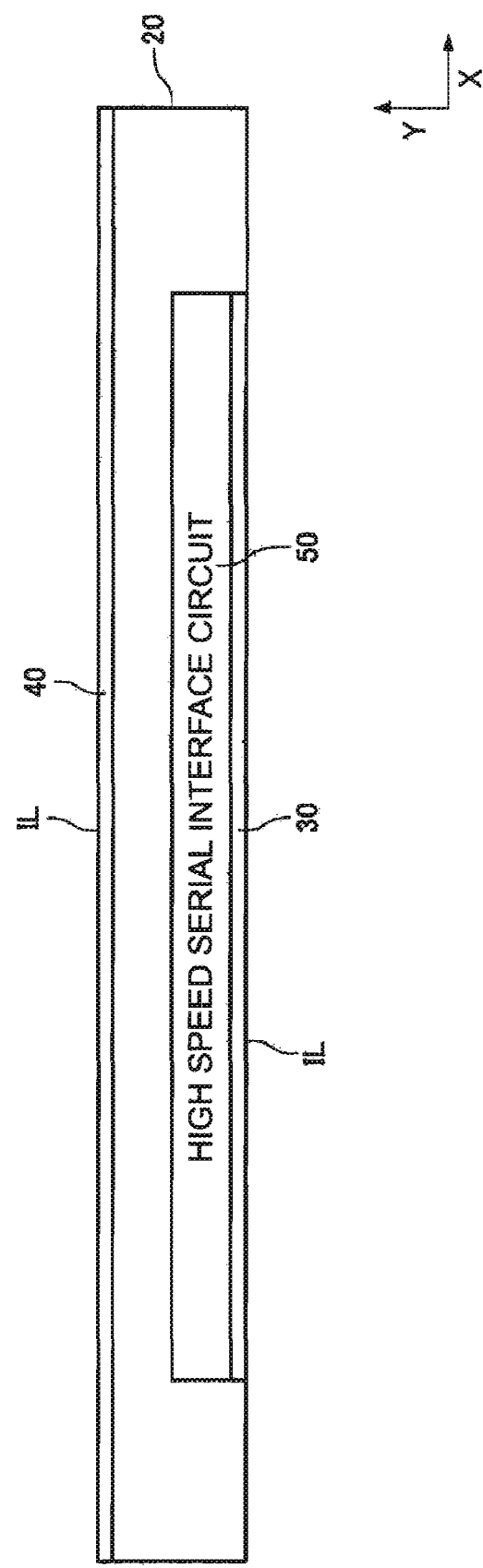
FIG. 3 illustrates a plane layout of a portion of the integrated circuit device according to the embodiment of the invention.

In FIG. 3, provided along two longer sides IL of the display driver 20 are an input pad area 30 and an output pad area 40. The display driver 20 further includes the high speed serial interface circuit 50 or the interface circuit in broad meaning at a central area in the X direction along the longer side IL and in an inner side area of the input pad area 30. The reason why such an arrangement was employed is because data signals to be input into the high speed serial interface circuit 50 are important. Arrangement of the high speed interface circuit 50 in the middle of the longer side IL involves arrangement of the pads to be connected thereto also in the middle of the longer side IL. In the embodiment, the pads formed with bumps are brought into contact with a pattern on the glass substrate through conductive adhesive. The middle area of the longer side IL of the display driver 20 has better connection ability of bumps than that of both end areas, and therefore the possibility of the failure of data signals due to contact failure can be minimized.

2. High Speed Serial Interface Circuit

Figure 4:
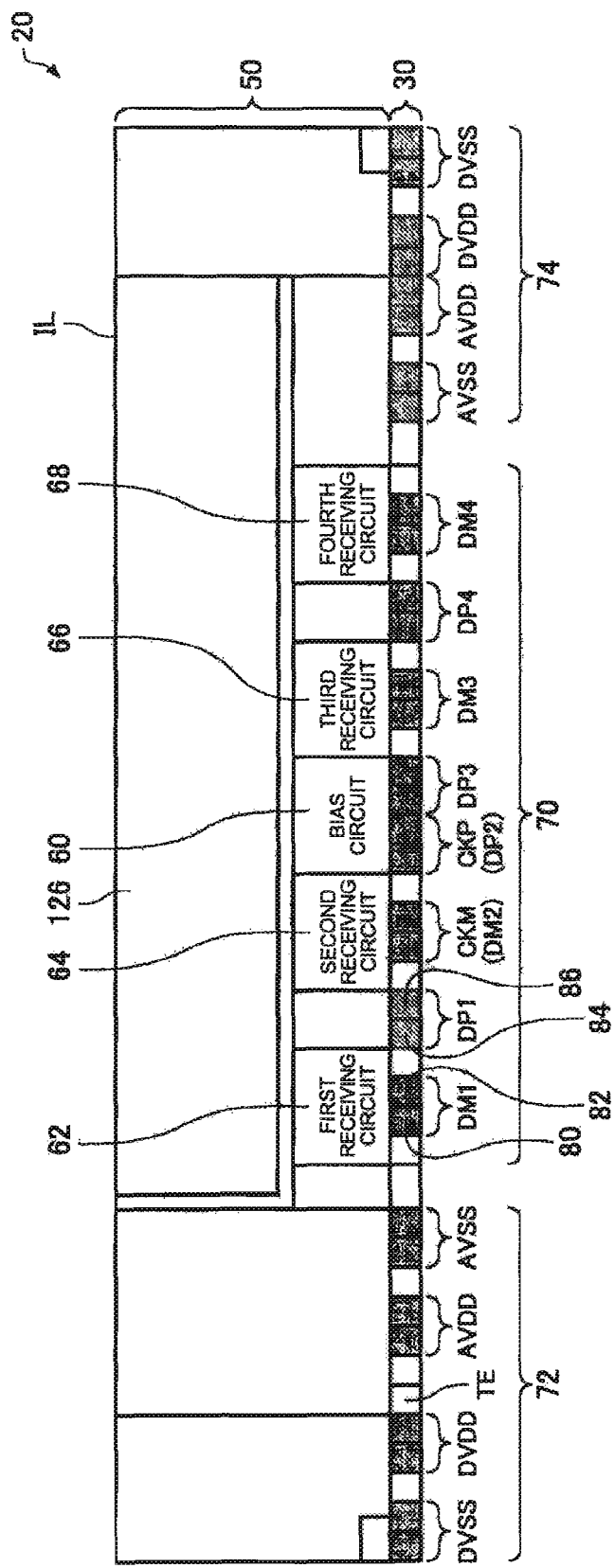
FIG. 4 is an enlarged plane view of a high speed serial interface circuit as shown in FIG. 3 and an input pad area corresponding thereto.

FIG. 4 is an enlarged plane view of the high speed serial interface circuit 50 and the corresponding input pad area 30. The high speed serial interface circuit 50 is provided with a bias circuit 60 in the middle of the longer side IL of the display driver 20 in which, for example, the four receiving circuits such as the first to the fourth receiving circuits 62, 64, 66, 68 are positioned in such a manner two of them are on one side of the bias circuit 60 and the other two of them are on the other side of the bias circuit 60. The first to the fourth receiving circuits 62, 64, 66, 68 are supplied with constant voltage through the bias circuit 60.

The input pad area 30 includes a data signal input area 70 in the middle of the longer side IL and further includes power input areas 72, 74 at both sides of the data signal input area 70.

The input pad area 30 is provided with a total number of 16 bumps in such a manner four bumps are provided with each of the first to the fourth receiving circuits 62, 64, 66, 68, more specifically, for example, the first receiving circuit 62 is provided with four bumps 80, 82, 84, 86. According to the embodiment, the first to the fourth receiving circuits 62, 64, 66, 68 serve to receive a pair of differential signals such as DP signals and DM signals. The first pair of differential signals DP1, DM1 is input to the first receiving circuit 62 through the bumps 80, 82, 84, 86. The second pair of differential signals DP2, DM2 is input to the second receiving circuit 64, the third pair of differential signals DP3, DM3 is input to the third receiving circuit 66, and the fourth pair of differential signals DP4, DM 4 is input to the fourth receiving circuit 68, respectively. Here, the second pair of differential signals DP2, DM2 is a pair of differential clock signals CKP, CKM.

Figure 5:
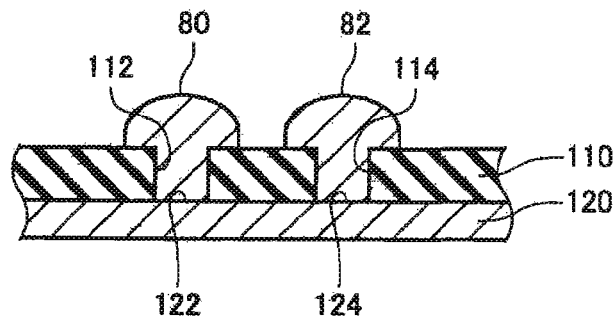
FIG. 5 is a cross sectional view of a double bump as shown in FIG. 4.

A pair of adjacent bumps such as the bumps 80, 82 is formed, for example, of Au or the like, on two pads 122, 124 provided on the uppermost metal layer or the fifth metal layer 120 of the embodiment so as to be exposed through openings 112, 114 of a passivation film 110 as shown in FIG. 5. The pair of bumps 80, 82 is a double bump having a conduction through the metal layer 120. In the embodiment, the differential signal DM1 of the first pair of differential signals DP1, DM1 is commonly input to the double bump.

The other pairs of bumps are also formed into the double bumps having the conduction in a similar manner as stated above. The common signals are input to the double bump, respectively, in a corresponding manner.

At both sides of the bumps for the pair of differential signals, two pairs of bumps are provided for the use of an analog VSS power source referred to as AVSS in short. At outsides thereof, two pairs of bumps are provided for the use of an analog VDD power source referred to as ADVV in short. In the power input area 72, outsides the pair of bumps for the use of the analog VDD power source is provided with a bump for test signals TE. The power input areas 72, 74 are provided with pairs of bumps for a logic VDD power referred to as DVDD in short at both ends, respectively. Further, outside thereof, pairs of bumps for logic VSS power source referred to as DVSS in short are provided, respectively.

Since the bumps for differential signals are formed into double bumps as stated above, contact resistance in the middle of the differential signal line can be lowered, i.e., a low impedance, thereby enabling to avoid a delay of the differential signals and signal corruption. Further, the double bumps enable accurate measurement of the terminator using four-terminal method in which different bumps are used for a current supply terminal and a voltage measurement terminal as will be described later.

Figure 6:
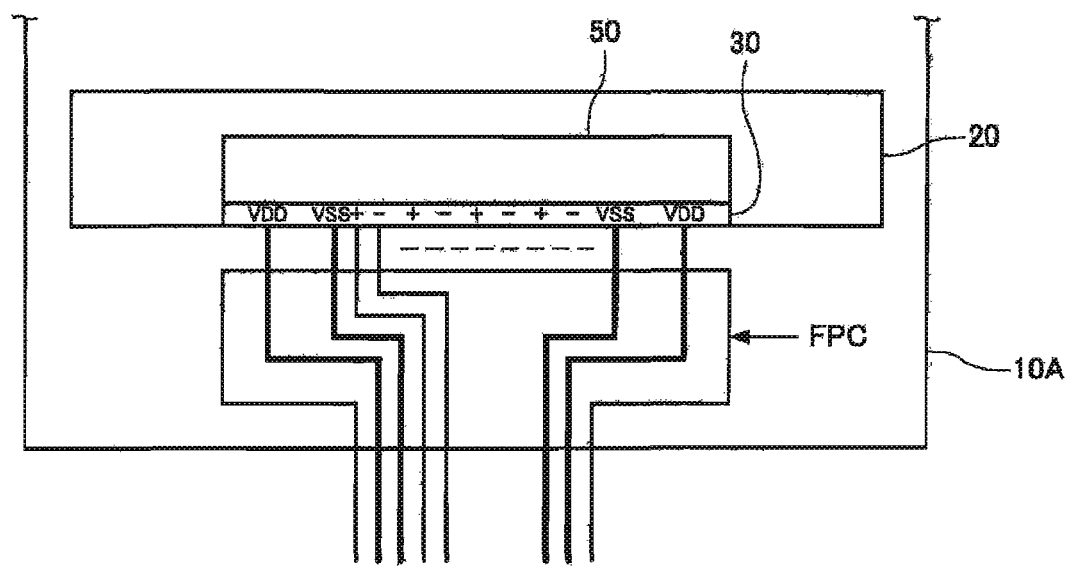
FIG. 6 illustrates a wiring pattern between a glass substrate on which a display driver is mounted and a flexible printed circuit board.

FIG. 6 schematically illustrates a state that the display driver 20, mounted on the glass substrate 10A on which the display panel 10 is formed, and a host, not shown here, is connected through a flexible printed circuit board FPC. The double bumps are employed in FIG. 4, whereas a pattern is shown in FIG. 6 when a single bump is employed for ease of the explanation and also only the analog VDD and VSS are illustrated in FIG. 6 in stead of illustrating both of the analog VDD, VSS and the logic VDD, VSS.

As shown in FIG. 6, as a result of employing a bump arrangement in FIG. 4, each of the wiring patterns on the glass substrate 10A and the flexible printed circuit board FPC is so formed that the signal lines of four pairs of the pair of differential signals are arranged between power supply lines of constant potentials, for example, between two VSS power supply lines in FIG. 6. Here, the wiring pattern to be formed on the glass substrate 10A can be formed only into a single layer, namely, different patterns cannot be crossed therewith, such that the pattern has to be arranged in accordance with the pad arrangement of the display driver 20. Further, it is impossible to form a multi-layered wiring, such as done in a microstrip, on the glass substrate 10A.

Since a signal amplitude of the differential data signals to be input into the high speed serial interface circuit 50 of the embodiment is small, the circuit is susceptible to an external noise as a data transfer is accelerated via the serial transfer. However, as seen from FIG. 6, VSS power supply lines are arranged at both sides of the four pairs of the pair of differential signal lines, or, in the case of the double pads, two VSS power supply lines are arranged at both sides thereof, respectively. The pair of the differential signal lines can, thereby, be shielded by the VSS power supply lines arranged at both sides of the signal lines, respectively. As such, to avoid the adverse effect from the outer noise, countermeasures can be realized against a EMI noise as well as a voltage noise due to a shielding effect of electric field and a current noise due to a shielding effect of magnetic field.

3. Terminator

Figure 7:
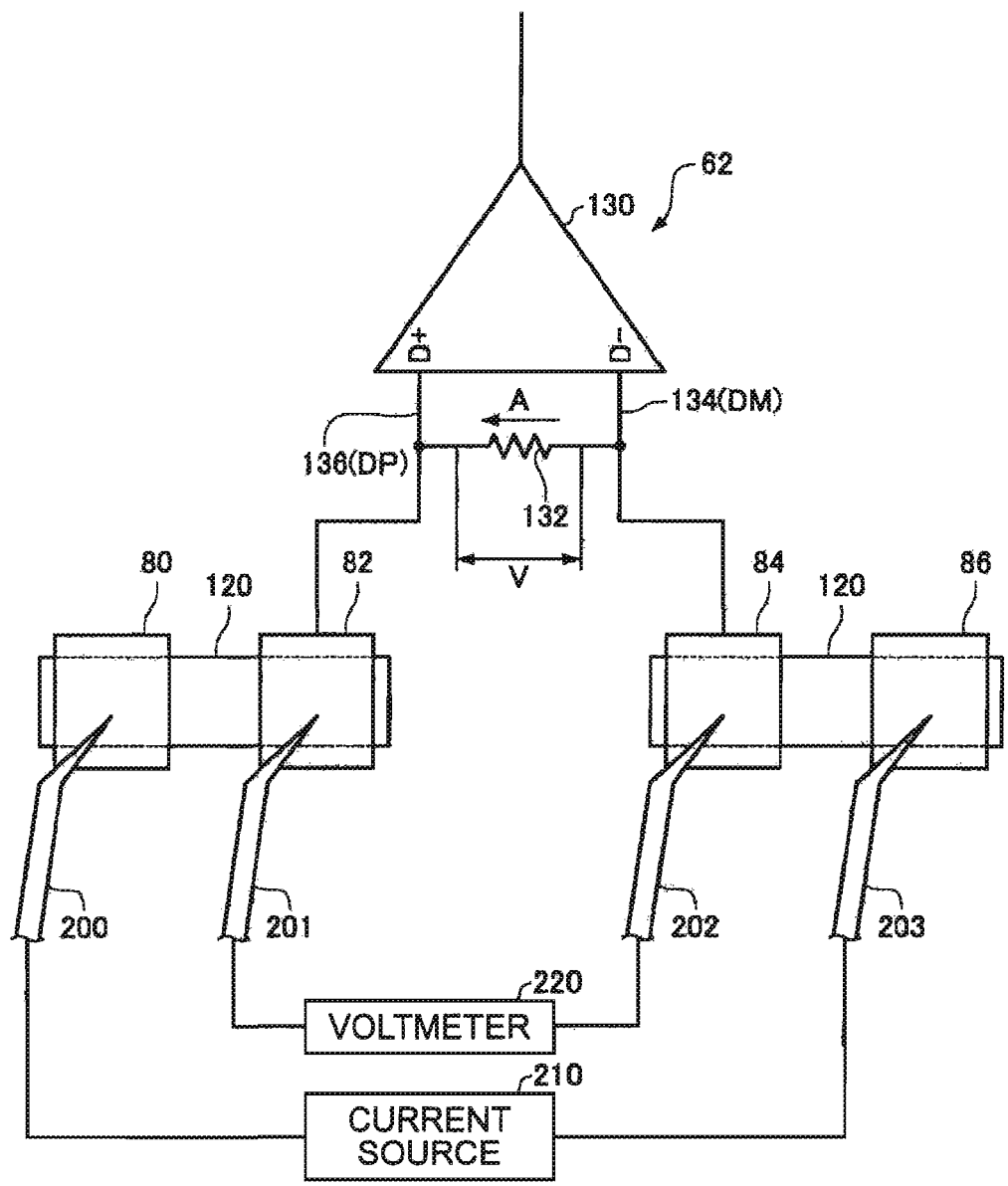
FIG. 7 illustrates a receiving circuit including a terminator and a four-terminal method for measuring the terminator.

Each of the first to the fourth receiving circuits 62, 64, 66, 68 as shown in FIG. 4 has a differential comparator 130 connected to a DP signal line 134 and a DM signal line 136, and a terminator 132 provided between the DP signal line 134 and the DM signal line 136 as shown in FIG. 7. The terminator 132 is required to have an absolute accuracy, for example of 100Ω in view of the standards. The terminator is a resist placed on an end of a wiring which prevent signals from reflecting, namely unnecessary signal reflection, at the end of the wiring and also prevent signals from unnecessary amplitude. That is, the terminator performs a matching between a signal source impedance and a load impedance.

Figure 8:
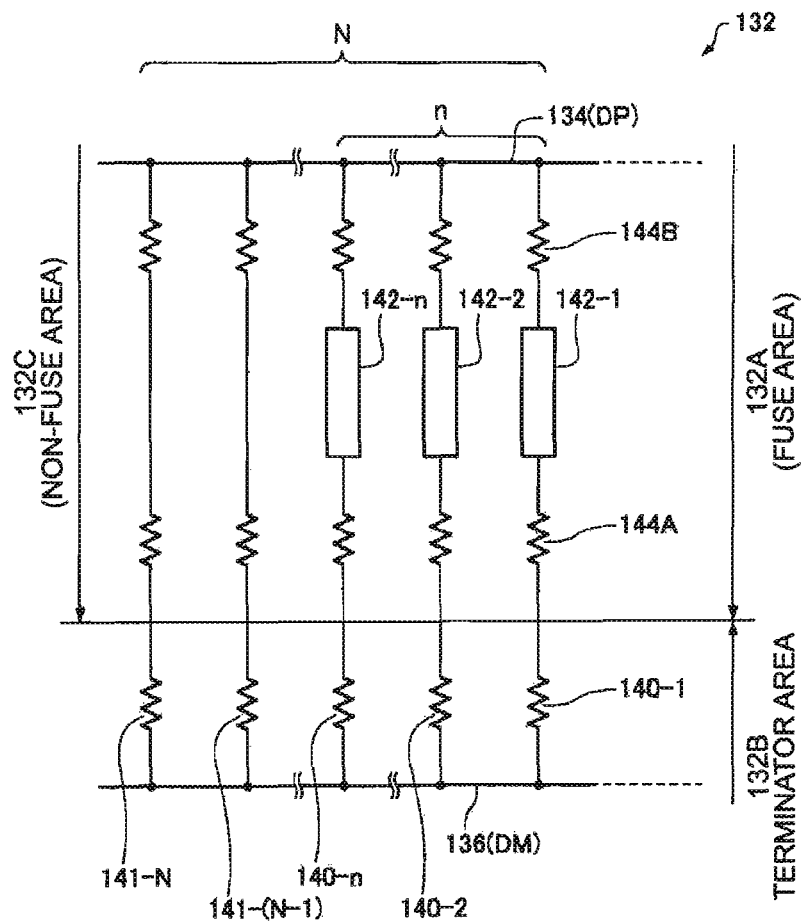
FIG. 8 illustrates an example of a circuitry including the terminator as shown in FIG. 7.

FIG. 8 shows an example of a circuit structure of the terminator 132 for which the absolute accuracy, for example of 100Ω, is required. As shown in FIG. 8, the terminator 132 has a fuse area 132A, a terminator area 132B and a non-fuse area 132C. The terminator area 132B has between the DP signal line 134 and the DP signal line 136 the first to the $N^{th}$ resistance elements 140-1 to 140-N which are connected in parallel to each other. Each of the first to the $n(1 \leq n < N)^{th}$ resistance elements 140-1 to 140-n is connected to the first to the $n^{th}$ fuse elements 142-1 to 142-n, referred to as cut-off elements in broad meaning, respectively.

Here, provided that the resistance value on design of the terminator 132 is defined as MΩ and each resistance value on design of the first to the $N^{th}$ resistance elements is defined as LΩ, an inequality of L/N<M<L/(N−n) is established.

For example, provided that the resistance value M on design of the terminator 132 is defined as 100Ω and the resistance value L on design of each of the first to the $N^{th}$ resistance elements 140-1 to 140-N is defined as 2000Ω, the equations of N=25 and n=10 are established. In such a case, since L/N=80<M=100<L/(N−n)=133.3, the above stated inequality is established.

Figure 9:
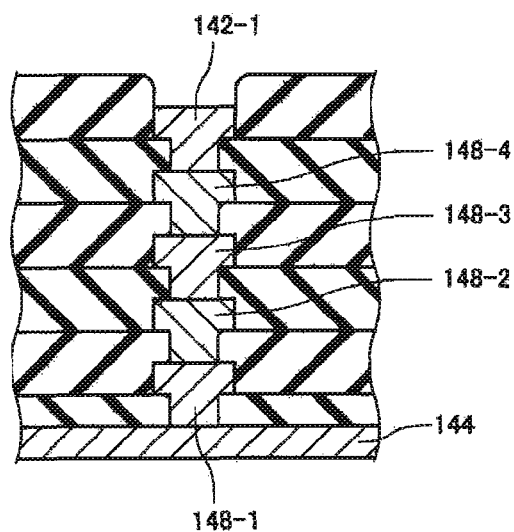
FIG. 9 is a cross sectional view illustrating one end of a fuse element as shown in FIG. 8.
Figure 10:
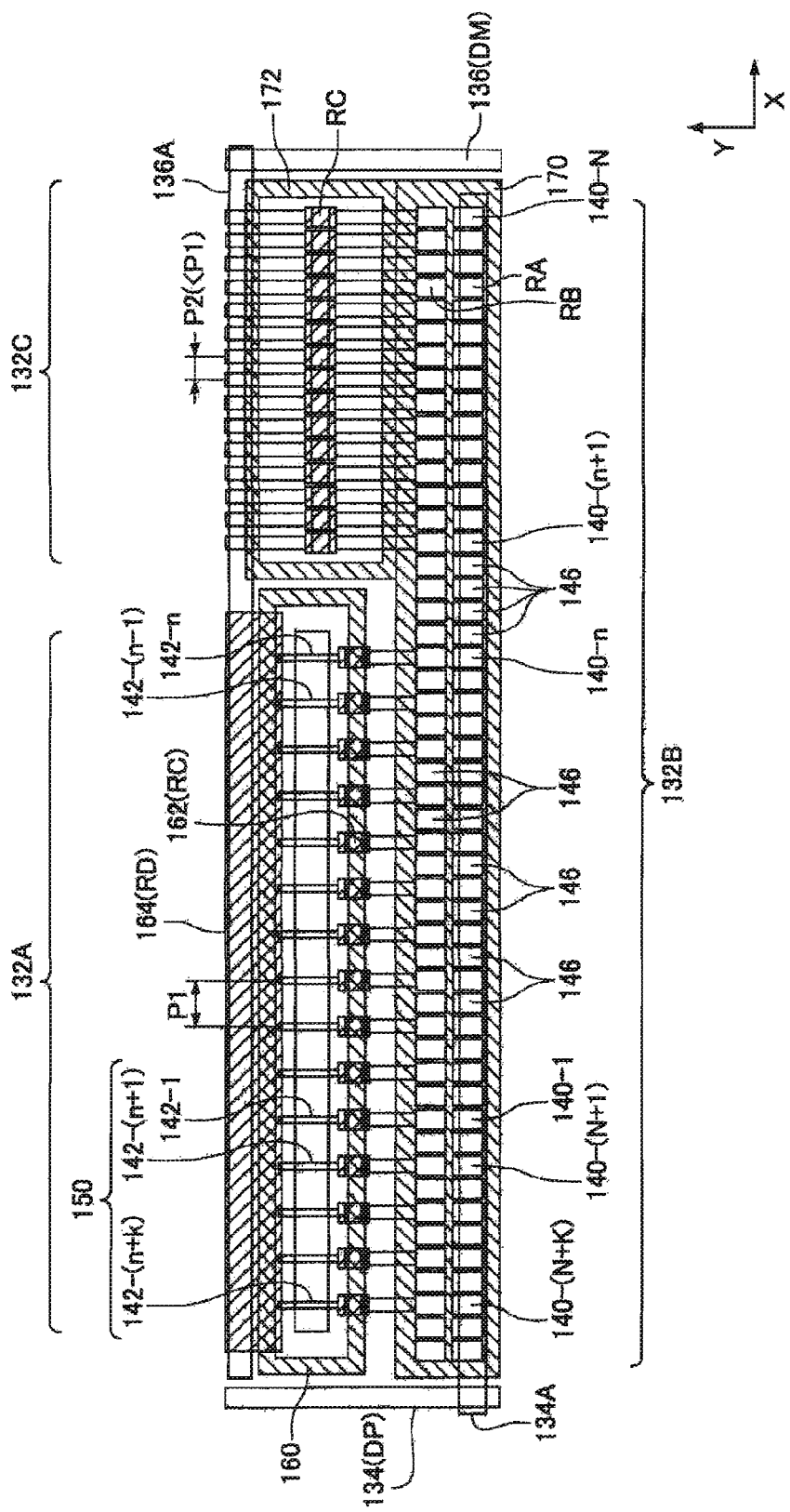
FIG. 10 illustrates a plane layout of the terminator as shown in FIG. 8.

Here, the first to the $n^{th}$ fuse elements 142-1 to 142-n are formed on the uppermost metal layer or the fifth metal layer of the embodiment for the sake of laser trimming upon adjustment of the terminator. As shown in FIG. 10 which will be explained later, the ring shaped metal wiring 160, not shown in FIG. 8, is formed in such a manner enclosing the first to the $n^{th}$ fuse elements 142-1 to 142-n in a plane view and simultaneously superimposing layers one another from the first metal layer to the fifth metal layer. Accordingly, in order to draw out wirings from the fuse elements 142-1 to 142-n inside the ring shaped metal wiring 160, avoiding a contact with the ring shaped metal wiring 160, unnecessary long wirings to be drawn out are required. These unnecessary long wirings establishes a connection between one end of each of the first to the $n^{th}$ fuse elements 142-1 to 142-n and the polysilicon layer 144 or a nonmetal wiring layer in broad meaning through the first to the fourth via holes 148-1, 148-2, 148-3, 148-4, as shown in FIG. 9. The polysilicon layer 144 will work as a resist layer.

For the reasons as stated above, each of the first to the $n^{th}$ fuse elements 142-1 to 142-n has at both sides thereof a polysilicon resistance element 144A or a first nonmetal resistance element in broad meaning and a polysilicon resistance element 144B or a second nonmetal resistance element in broad meaning, respectively, as shown in FIG. 8. In other words, each of the parallel lines has an added value of 2000Ω and a polysilicon resistance value. Additionally, there are variations of the resistance values in the first to the $N^{th}$ resistance elements 140-1 to 140-N and the polysilicon resistance elements 144A, 114B in manufacturing parallel lines, and further each of the parallel lines has the parasitic resistance.

For the reasons as stated above, provided that the designed value L of the resistance value of each of the parallel-connected first to the $N^{th}$ resistance elements 140-1 to 140-N is defined as 2000Ω, the resistance value M of the terminator 132 can not always become 100Ω even if some of the fuse elements are cut to finally use the total 20 resistance elements 140-1 to 140-20. Therefore, in the embodiment, for example, fuse elements are serially connected to the resistance elements, for example of n=10, one by one among the parallel-connected first to the $N^{th}$ resistance elements 140-1 to 140-N, for example of N=25. Then, some of the fuse elements among the n fuse elements are cut while the resistance value of the terminator 132 is measured to enabling an adjustment of the resistance value of the terminator 132.

Preferably, a lower limit of the designed value of the resistance value of each of the first to the $N^{th}$ resistance elements 140-1 to 140-N is set to a value where a total value of the polysilicon resistance value, i.e., several tens of Ω in the embodiment, at the both sides of each of the first to the $n^{th}$ fuse elements 142-1 to 142-n is negligible. An upper limit of the designed value of the resistance value of each of the first to the $N^{th}$ resistance elements 140-1 to 140-N is set relating to the number N of parallel-connected resistance elements. The larger the number of N, the broader the arrangement area of the first to the $N^{th}$ resistance elements 140-1 to 140-N. In the embodiment, taking both of the limits into consideration, the designed value of the resistance value of each of the first to the $N^{th}$ resistance elements 140-1 to 140-N is defined as a resistance value of a four-digit number, for example of 2000Ω, that is lager by two digits than the polysilicon resistance value of a two-digit number, for example of 16.5Ω, of one end of each of the first to the $n^{th}$ fuse elements 142-1 to 142-N. It is a matter of course that the designed value of the resistance value of each of the first to the $N^{th}$ resistance elements 140-1 to 140-N can be set to a value larger than the 16.5Ω or larger than the two-digit number as far as the arrangement area for the first to the $N^{th}$ resistance elements 140-1 to 140-N can be secured.

Figure 11:
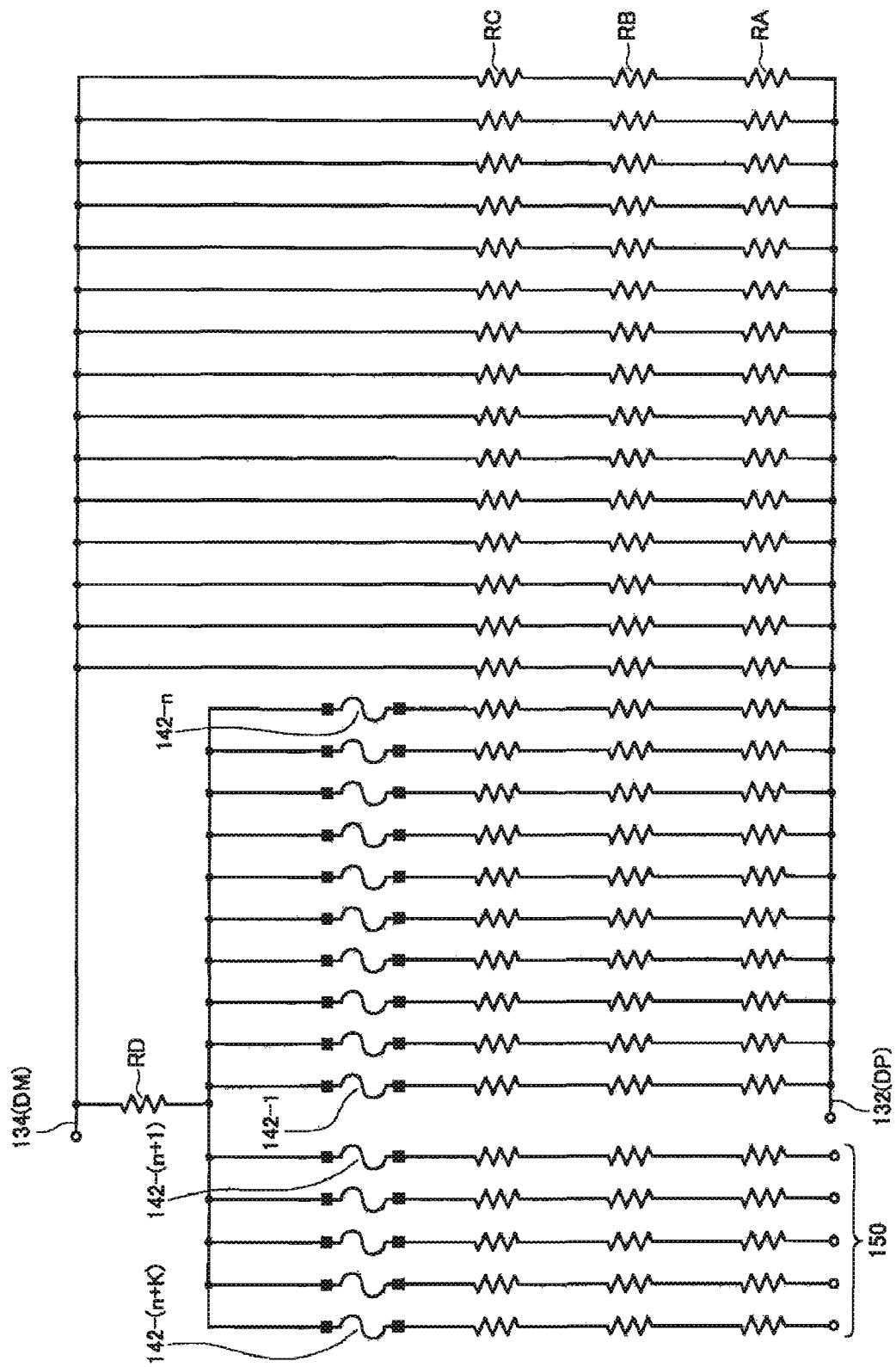
FIG. 11 is a circuit diagram including the terminator as shown in FIG. 10.

FIG. 10 shows an example of a pattern layout of the terminator 132. FIG. 11 shows an equivalent circuit of the terminator of FIG. 10. In each figure, each of n parallel lines arranged between the DP signal line 134 and the DM signal line 136 is serially connected to resistors RA, RB, RC. The resistors RA, RB compose each of the first to the $N^{th}$ resistance elements 140-1 to 140-N as shown in FIG. 8. Namely, there is the designed value of RA+RB=1000Ω+1000Ω=2000Ω. On the other hand, the resistor RC, for example, having a resistance value of 16.5Ω, composes the polysilicon resistor 144A in FIG. 8. In the embodiment, a resistor RD is commonly connected to one end of each of the n fuse elements 142-1 to 142-n. Since the resistance value of the resistor RD is very little, for example, 0.3Ω, the resistor RD is not provided the (N−n) parallel lines which are not connected to the first to the $n^{th}$ fuse elements 142-1 to 142-n. The N parallel lines are arranged so as to have the same resistance values between all the lines, except for the n fuse elements 142-1 to 142-n, to be manufactured in the same process.

In FIGS. 10 and 11, there are k spare lines 150, not shown in FIG. 8, where k is a natural number, for example k=5. The k spare lines 150 are free of the DP wiring 132 at their one ends as seen in FIG. 11. Each of the k spare lines 150 is structurally identical to each of the n parallel lines having the fuse elements, except for an absence of a connection with the DP wirings 132.

In FIG. 10, a lot of resistors RA, RB are arranged in the X direction with equally pitched. The number of the resistor RA is larger than the number of the parallel lines (N+k) including the k spare lines 150. The reason thereof follows. An arrangement pitch P1 of the (n+k) fuse elements 142-1 to 142-n is larger than an arrangement pitch P2 of the parallel lines without fuse elements. Accordingly, if there are the same number of the resistors RA, RB as the number of the parallel lines (N+k), the arrangement pitch of the resistors RA, RB to be connected to the (n+k) fuse elements 142-1 to 142-n in an arrangement area becomes sparse, whereas the arrangement pitch of the resistors RA, RB to be connected to the (N−n) parallel lines in the arrangement area other than the above area becomes dense. As such, a patterning accuracy of the resistors RA, RB becomes worse to case a larger variation of the resistance values between the parallel lines. Therefore, in the embodiment, the pitch P1 is defined as an integral multiple of the pitch P2, for example, P1=2×P2, and portions of the resistors RA, RB to be arranged equally spaced are made to be unwired dummy resistance elements 146. Consequently, the resistors RA, RB are set so as to have a designed value of 1000Ω, respectively, with rather high accuracy.

Here, the DP wiring 132A extending in the X direction, which are connected to the DP wiring 132 in the Y direction, and the resistor RA are connected through the via holes; however, if the via holes are not provided between the dummy resistance elements 146 and the DP wiring 132, the k spare lines 150 are obtainable as illustrated in the equivalent circuit in FIG. 11. The via holes may be provided as required between any one or more of the k spare lines 150 and the DP wiring 132 in order to change the number of the parallel lines. This change of the number of the parallel lines can be performed in a process of sample production or in a pilot process performed prior to a commercial production process.

Provided around the (n+k) fuse elements 142-1 to 142-(n+k) is the ring shaped metal wiring 160 formed of the first to the fifth metal layers, which develops an absorption characteristic of the fuse area to provide an easy cut off of the fuse elements. Accordingly, each end of each of the (n+k) fuse elements 142-1 to 142-(n+k) is provided with the resistance element RC, or the first nonmetal resistance element in broad meaning, formed on the polysilicon layer 162, or the nonmetal wring layer in broad meaning, which is under the ring shaped wiring 160. Each of the other ends of the (n+k) fuse elements 142-1 to 142-(n+k) is provided with the resistance element RD, or the second nonmetal resistance element in broad meaning, formed on the polysilicon layer 164, or the nonmetal wiring layer in broad meaning, having a wide area under the ring shaped wiring 160. The polysilicon layer 164 is connected through the via holes to the DM wirings 136A in Y direction, which is connected to the DM wiring 136 extending in X direction.

In FIG. 10, the terminator area 132B is provided with a ring shaped wiring 170 and the non-fuse area 132C is provided with a ring shaped wiring 172 as well. The non-fuse area 132C is provided with the resistance elements RC, or the third nonmetal resistance elements in broad meaning, formed on the polysilicon layer, or the nonmetal wiring layer in broad meaning, in the similar manner as the fuse area 132A, and one end of each of the resistance elements RC is connected to the DM wiring 136A through the corresponding via hole.

4. Adjustment Method of Terminators

A measuring method of the terminator 132, for example, of the first receiving circuit 60, by means of four-terminal method is explained here referring to FIG. 7. Each of a first to a fourth probes 200, 201, 202, 203 are brought into contact with the four bumps 80, 82, 84, 86 for the first receiving circuit 60 in a corresponding manner. The first and the fourth probe 200, 203 are connected to the power source 210. Current flow A supplied from the power source 210 flows from the fourth probe 203 through the pad 86, the pad 84, the DP wiring 134, the terminator 132, the DM wiring 136, the bump 82, the bump 80 and finally to the first probe 200. While this current flow, a dropped voltage V at the terminator 132 is measured by a voltmeter 220 through the pads 82, 84 and the second and the third probes 201, 202. Therefore, the resistance value R of the terminator 132 is obtainable by an equation of R=V/A. More specifically, if the current A is set to about 3 mA which is the same as that of the actual operation, the resistance value of the terminator 132 can be measured precisely.

Figure 12:
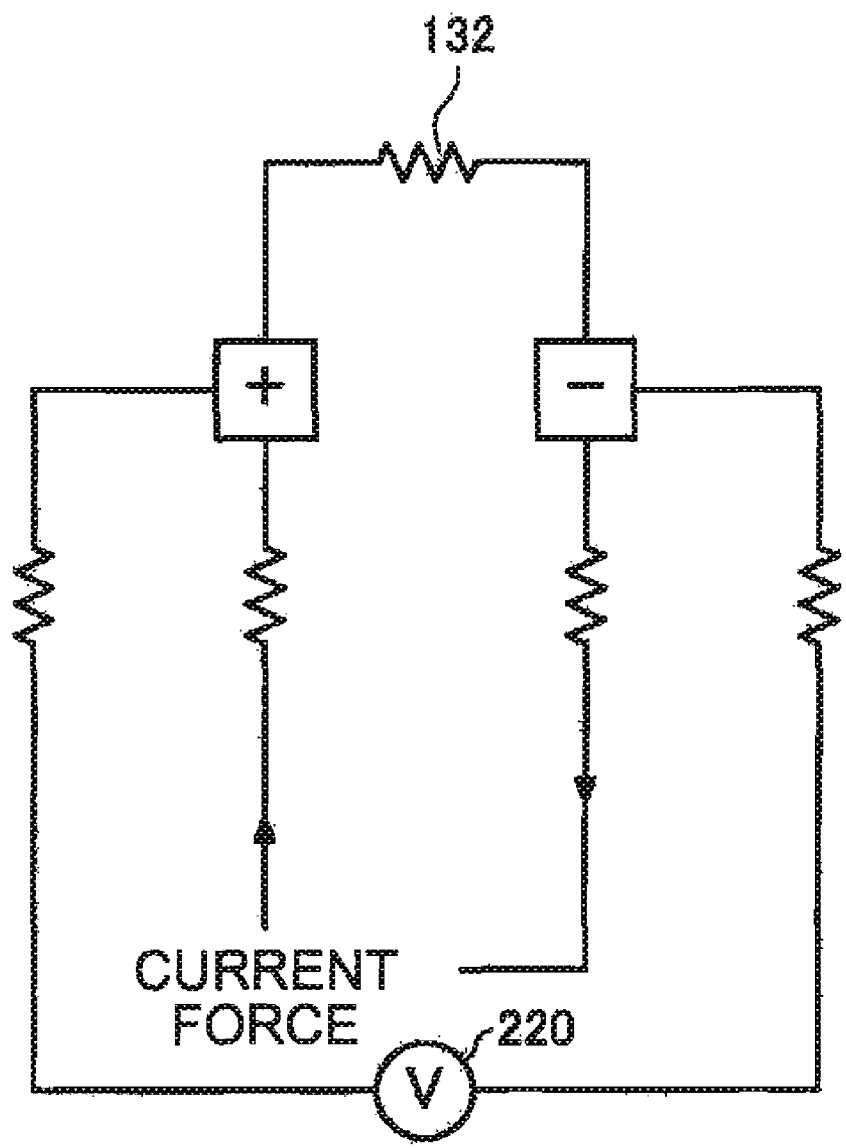
FIG. 12 is a schematic illustration of a two-terminal method for measuring the terminator.

On the other hand, in two-terminal method as shown in FIG. 12, a single terminal is utilized as both of a current supply terminal and a voltage measurement terminal. In this two-terminal method, there has been a problem that a resistance of measuring system has to be considered when measuring voltage at the voltmeter 220 since current flows through the measuring system containing the voltmeter 220. In two-terminal method, there has been a further problem that a voltage measurement for current flow at the time of actual operation is not possible since it is not possible to flow current by mili-order such as current flow of 1.5 to 3 mA to be supplied by a device at the time of actual operation. An attempt to force to apply two probes to each one of two bumps as shown in FIG. 12 is not possible since two probes contact each other in the two-terminal method.

For an adjustment of the terminator 132, the resistance value of the terminator 132 is measured, for example, under a state that none of the first to the $n^{th}$ fuse elements 142-1 to 142-n is cut off. In this case, a resultant value of the terminator 132 shows a value equal to or more than an adjustment value of 100Ω. On the basis of a difference between the adjustment value and the measurement value, any one of or a plurality of the first to the $n^{th}$ fuse elements 142-1 to 142-n are cut off by means of a laser trimming. Since each resistance value of the parallel lines in the case where N=25 is approximately 2000Ω in the embodiment, an adjustable range per one parallel line becomes 4%, and therefore it is possible to determine how many fuse elements are to be cut off referring to this adjustable range.

Because each resistance element of the each line of the terminator area 132B as shown in FIG. 10 are manufactured in the same process, differential between the resistance elements is small, and if there is the differential between the resistance elements in a lot, such differential within the same lot will be stable. Consequently, the resistance value per one line can be calculated according to a presence or an absence of the fuse element based on the result of measuring the terminator, such that it becomes easy to calculate how many fuse elements are to be cut off in order to obtain the targeted terminator value.

The terminator is adjustable by means of metal wiring masks instead of the cut-off elements such as the fuse elements. In the sample production process or a pilot process to be done prior to the commercial production, the terminator of the product is measured and then the metal wiring used in stead of the fuse element is connected through or cut off by the metal wiring masks on the basis of the measurement result, thereby adjusting the terminator. With such process, the resulting circuit will be large in size, while a single piece of the metal wiring mask will achieve the adjustment of the terminator without a necessity of the fuse cut-off process. Further, since the adjustment of the terminator is performed by the metal wring mask, an increase of through put and an easy handling of the process modification is obtainable. However, since this adjustment is performed on the basis of the resistance value of the lot manufactured prior to the sample production or the commercial production, accuracy of the adjustment degrades comparing to the adjustment by fuse cut-off.

5. Modifications

In the foregoing, the invention was explained in the light of the embodiment; however, it will be appreciated by one skilled in the art with ease that many modifications can be made without substantially departing from the scope and the advantageous result of the invention. Therefore, such modifications should be considered as being embraced within the scope of the invention. For example, any terminologies in the specification or the drawings which are at least once written along with another expressions having broader or synonymous meaning should be allowed to be replaced with such another expressions in anywhere in the specification or the drawings.

The interface circuit according to the invention is not limited to the above described interface circuit installed within the liquid crystal driver IC but can be any interface circuit including the terminator. The interface circuit according to the invention also is applicable to USB, IEEE1394 or OTG.

This entire disclosure of Japanese Patent Application No.2005-197934, filed Jul. 6, 2005 is expressly incorporated by reference herein.

What is claimed is:

1. An interface circuit comprising:
a terminator,
the terminator including parallel-connected first to an $N^{th}$ resistance elements, where N being an integral number equal to or more than 2,
a first to an $n^{th}$ cut-off elements being connected in serial with each of the corresponding n($1 \leq n < N$) first to the $N^{th}$ resistance elements of the first to the $N^{th}$ resistance elements, and
each of the $N^{th}$ resistance elements being connected in serial with at least two other resistance elements.

2. The interface circuit according to claim 1, the terminator satisfying an inequality of L/N<M<L/(N−n), where a designed value of the terminator is defined as MΩ and a designed value of the resistance value of each of the first to the $N^{th}$ resistance elements is defined as LΩ.

3. The interface circuit according to claim 1, each of the first to the $n^{th}$ cut-off elements being formed on the uppermost metal layer and a ring shaped wiring being provided in such a manner enclosing the first to the $n^{th}$ cut-off elements in a plane view and simultaneously superimposing layers one another from the lowermost metal layer to the uppermost metal layer, and both ends of each of the first to the $n^{th}$ cut-off elements being connected to a first and a second nonmetal resistance elements formed on the nonmetal wiring layer positioned under the lowermost metal layer, the first and second nonmetal resistance elements being at least two of the at least two other resistance elements.

4. The interface circuit according to claim 3, a resistance value of each of the first to the $N^{th}$ resistance elements being larger by two digits or more with regard to a digit number of a resistance value of the first nonmetal resistance element connected to one end of each of the first to the $n^{th}$ cut-off elements.

5. The interface circuit according to claim 4,
k spare lines, where k is a natural number, being arranged in parallel with N parallel lines each having one of the first to the $N^{th}$ resistance elements, including free ends at their one ends, and being provided with spare resistance elements having the same resistance values on design as one of the first to the $N^{th}$ resistance elements, respectively.

6. The interface circuit according to claim 5, the second nonmetal resistance elements being formed on the nonmetal wiring layer to which the other end of each of the first to the $n^{th}$ cut-off elements is commonly connected.

7. The interface circuit according to claim 6,
a third nonmetal resistance element having the same resistance value on design as the first nonmetal resistance element being connected to each of the (N−n) parallel lines unconnected to the first to the $n^{th}$ cut-off element and each of the k spare lines, respectively, the third nonmetal resistance element being at least one of the at least two other resistance elements.

8. The interface circuit according to claim 1, further comprising:
n parallel lines each having one of the first to the $n^{th}$ cut-off elements and the remaining (N−n) parallel lines,
an arrangement pitch of the N parallel lines being larger than that of the (N−n) parallel lines and dummy resistance elements unconnected to the first to the $n^{th}$ cut-off elements being provided between the n resistance elements each directly connected to the corresponding one of the first to the $n^{th}$ cut-off elements among the first to the $N^{th}$ resistance elements.

9. An integrated circuit device comprising:
the interface circuit according to claim 1;
a first signal terminal for receiving one of a pair of differential signals;
a second signal terminal for receiving the other one of a pair of differential signals;
a first signal line connected to the first signal terminal; and a second signal line connected to the second signal terminal, the terminator being connected to somewhere between the first and the second signal lines.

10. The integrated circuit device according to claim 9, the first signal terminal having mutually conducted two first pads with which corresponding one of two probes is brought into contact, and the second signal terminal having mutually conducted two second pads with which corresponding one of two probes is brought into contact.

11. The integrated circuit according to claim 10, the first to the $N^{th}$ resistance elements being arranged in a first direction in which the two first pads and the two second pads are arranged along.

12. The integrated circuit device according to claim 11, a length of an area where the first to the $N^{th}$ resistance elements being arranged in the first direction is shorter than that of an area where the two first pads and the two second pads are arranged in the first direction.

13. An electronic equipment comprising the integrated circuit device according to claim 9.

14. An interface circuit comprising:

a terminator, the terminator including parallel-connected first to an $N^{th}$ resistance elements, where N is an integral number equal to or more than 2, a first to an $n^{th}$ cut-off elements connected in serial with each of the corresponding $n(1 \leq n < N)$ first to the $N^{th}$ resistance elements of the first to the $N^{th}$ resistance elements, each of the $N^{th}$ resistance elements connected in serial with at least two other resistance elements, and the terminator satisfying an inequality of L/N<M<L/(N−n), where a designed value of the terminator is defined as MΩ and a designed value of the resistance value of each of the first to the $N^{th}$ resistance elements is defined as LΩ.

15. An interface circuit comprising:

a terminator, the terminator including parallel-connected first to an $N^{th}$ resistance elements, where N is an integral number equal to or more than 2, a first to an $n^{th}$ cut-off elements connected in serial with each of the corresponding $n(1n \leq N)$ first to the $N^{th}$ resistance elements of the first to the $N^{th}$ resistance elements, and the terminator satisfying an inequality of L/N<M<L/(N−n), where a designed value of the terminator is defined as MΩ and a designed value of the resistance value of each of the first to the $N^{th}$ resistance elements is defined as LΩ.

16. An integrated circuit device comprising:

the interface circuit according to claim 15;

a first signal terminal for receiving one of a pair of differential signals;

a second signal terminal for receiving the other one of a pair of differential signals;

a first signal line connected to the first signal terminal; and a second signal line connected to the second signal terminal, the terminator being connected to somewhere between the first and the second signal lines.

17. An electronic equipment comprising the integrated circuit device according to claim 15.

* * * * *